Jan. 28, 1941.    F. W. BURGER ET AL    2,229,724
WHEEL
Filed Aug. 24, 1939    2 Sheets-Sheet 1
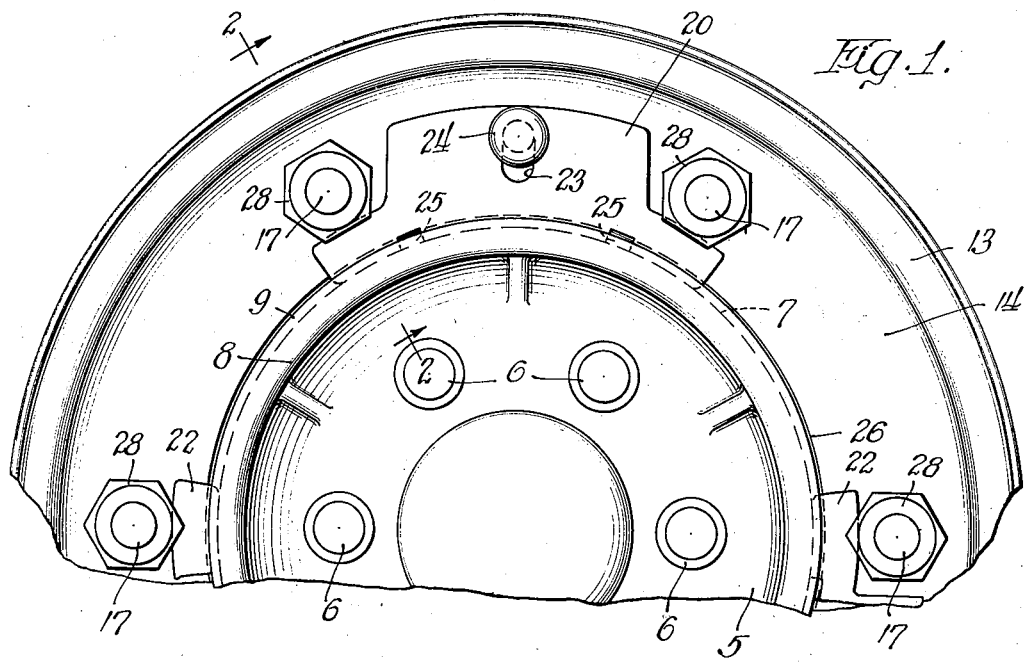
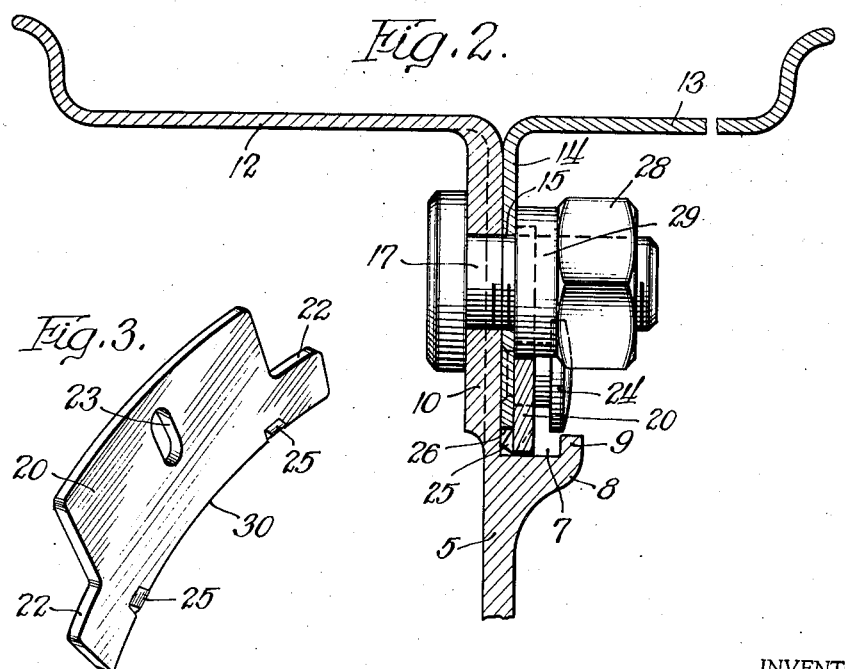
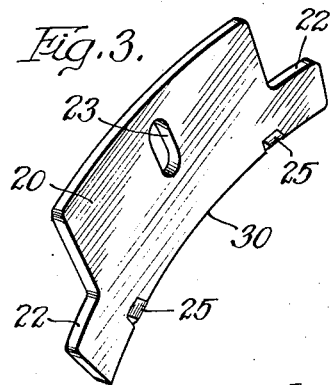
INVENTOR.
FREDERICK W. BURGER. WALTER E. SCHIRMER.
BY Walter E. Schirmer
ATTORNEY.

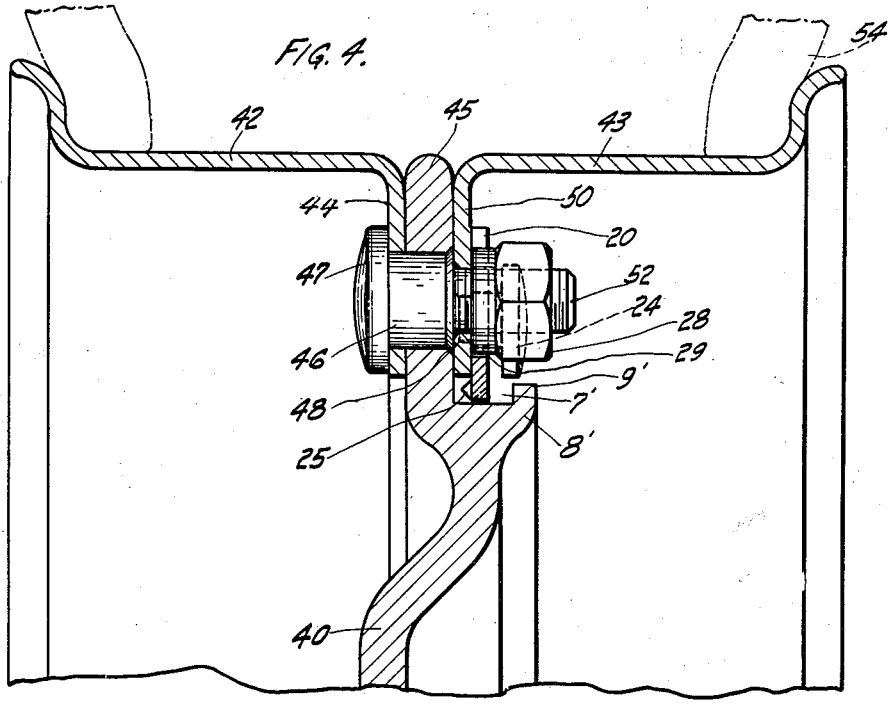
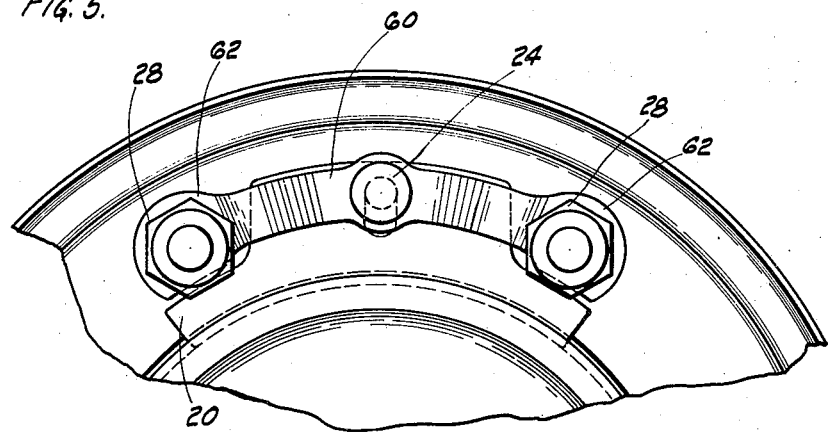

Patented Jan. 28, 1941

2,229,724

UNITED STATES PATENT OFFICE 2,229,724

WHEEL

Frederick W. Burger, Niles, and Walter E. Schirmer, Buchanan, Mich., assignors to Clark Equipment Company, Buchanan, Mich., a corporation of Michigan Application August 24, 1939, Serial No. 291,678

10 Claims. (Cl. 152—405)

This invention relates to wheels, and more particularly is directed to wheels of the type employed for traveling in sandy countries, such as deserts and the like where an extremely wide rim and tire is employed in order to secure adequate traction and prevent the wheels from sinking too far into the loose sand or gravel.

One of the primary objects of the present invention is to design a wheel assembly in such manner that the clamping means is so arranged that it is impossible to remove the tire from the rim until the tire has been completely deflated.

Another feature of the present invention is the provision of means associated with the clamping means for preventing removal of the tire from the rim until the clamping means has been released and the tire is in a completely deflated condition.

In carrying out the present invention, we may provide a wheel assembly comprising a disc like body portion terminating in a partial rim section which is completed by a second member to form the complete rim for receiving the tire. This rim is of substantial width and the second member is adapted to be secured to circumferentially spaced studs on the first member by means of clamping nuts. The body portion is provided with a radially outwardly directed annular groove having a peripheral lip which is of a diameter slightly less than the inner diameter of the second rim forming member so that the same may be slipped thereover. However, carried on the radial face of this member are locking plates which have limited movement relative to the member so that they may be moved radially outwardly to pass over the lip and then must be forced radially inwardly within the lip in order to apply the clamping nuts. When in this position, they effectively prevent any possibility of the second rim member being released from the wheel body member until the tire has been completely deflated, inasmuch as they cannot be moved upwardly to clear the lip until the pressure has been released.

Preferably, these plates are secured by means of suitable rivets permanently to the second rim member so that they cannot become lost during assembly of the wheel or cannot be mounted in an incorrect position. In this connection the plates are provided with suitable tang means engaging under the inner radial edge of the second rim member when in clamped position to prevent their movement outwardly unless all pressure is released and the clamping nuts are removed from the studs.

The present wheel construction has the desired features of simplicity in design and assembly, as well as facilitating the changing of tires by means of the split type of rim.

In a modified form of construction, two complementary rolled rim sections are provided, one of which is permanently secured to one face of a cast, pressed or forged plate by means of studs locked therebetween, the studs having extensions for detachably securing the other rim section thereto in the same manner as previously described. This materially reduces the cost of the assembly by eliminating a number of machining operations and substituting rolling operations therefor.

Other objects and advantages of the invention will be more apparent from the following detailed description which, taken in conjunction with the accompanying drawings, will disclose to those skilled in the art the particular construction and operation of the preferred forms of the invention.

In the drawings:

Figure 1 is a partial elevational view of a wheel construction according to the present invention;

Figure 2 is a sectional view taken substantially on line 2—2 of Figure 1;

Figure 3 is a perspective view of the locking plate;

Figure 4 is a sectional view of a modified form of construction; and

Figure 5 is an elevational view of the structure of Figure 4 in slightly modified form.

Considering now in detail the invention as disclosed by Figures 1 to 3, a wheel body is indicated generally at 5 comprising an inner portion having circumferentially spaced bosses 6 for mounting the same on any suitable type of hub and provided radially outwardly of the bosses 6 with a radially outwardly directed annular groove 7 formed by an axially offset portion 8 of the disc and having its axial outer surface defined by the radially extending annular lip 9. Disposed outwardly of the groove 7 the wheel body portion 5 is of generally planar radial form comprising the portion 10 which terminates in the axially directed flange portion 12 forming a part of the rim for receiving the pneumatic tire or the like. The rim portion 12 is completed by a second cooperating rim section 13 of the member 14, this member having the radially inwardly directed disc-like portion apertured as at 15 to receive the clamping studs 17 carried by the portion 10 of the wheel body.

Mounted on the outer radial face of the portion 14 of the cooperating rim section are plates 20, indicated in detail in Figure 3, having laterally extending wing portions 22 and having a slotted central portion 23, this slotted portion receiving the shank of a rivet 24 which secures the plate loosely to the rim section 13.

It will be apparent that with the construction shown, the plate 20 has limited radial movement relative to the rivet 24, and consequently relative to the portion 14 thereof. This movement is limited by the length of the slot 23 and also by the provision of two inwardly struck tangs 25 which, when the plate is in locking position, extend beneath the inner peripheral edge 26 of the rim section 13 to hold the plate against radial outward movement. The plate is of generally arcuate form, and the wing portions 22 are adapted to extend beneath successive studs 17 carried by the wheel body. The clamping nuts 28 which are adapted to be threaded over the projecting ends of the studs are provided with shank portions 29 which, when threaded inwardly into abutting engagement with the face portion 14 of the member 13, are so positioned as to lie immediately above the ears 22 in such manner as to prevent any radial movement of the plate 20 relative to the rim section 13. This effectively locks the plate in a position wherein its lower edge is disposed in the channel 7, and it cannot be raised to permit it to clear the defining lip 9.

When it is desired to change the tire it is necessary that the tire be completely deflated before the clamping means can be released so as to allow removal of the rim section 13. It is essential to provide some safe-guard of this type to prevent the possibility of accident to the operator if it is attempted to remove the rim section 13 when there is any pressure in the tire. When the tire has been completely deflated and the clamping nuts 28 are threaded outwardly of the studs 17, the shanks 29 of the nuts move outwardly of the ears 22 to an extent sufficient to clear the same so that the member 20 is free to move radially outwardly except for the engagement of the tangs 25 beneath the inner edge thereof. With the nuts 28 thus removed, it will be apparent that if there is no pressure in the tire, the rim section 13 can be pressed inwardly to allow the tangs 25 to move outwardly from beneath the edge 26. This clears the tangs so that the plate may be moved radially outwardly to a position such that its lower edge 30 clears the defining surface of the lip 9, and thereby allows the rim section 13 to be completely removed from the wheel body 5.

However, it will be apparent that if there is any pressure in the tire tending to separate the sections 12 and 13, this will result in moving the plate 20 along with the portion 14 of the rim section into a position spaced from the portion 10 of the wheel body with the lower arcuate portion of the plate abutting against the radial inner face of the lip 9. In such a position, it is impossible to raise the plate out of the groove 7 by reason of the engagement of the tangs 25 with the edge 26 unless the pressure tending to separate the members 12 and 13 is removed.

In Figure 4 we have provided a modified wheel assembly embodying the same locking principles, but which reduces the cost of manufacture and assembly. The wheel in this form of the invention comprises an offset disc or body portion 40, provided with the axially offset annular rib 8' forming the channel 7' defined by the lip 9'. Two substantially identical rim sections 42 and 43 are provided, which may be rolled to form in any well known manner. The flange 44 of section 42 is secured to the peripheral portion 45 of the disc 40 by means of studs 46, which studs have head portions 47 bearing against the outer face of flange 44 and shoulder portions 48 staked or pressed into a recess of the portion 45 of the disc 40 to fix the section 42 permanently to the disc.

The complementary rim section 43 has a flange 50 which is apertured to receive the extending portion 52 of the studs 46, this flange being of an inner diameter such that it may pass axially over the lip 9' in the same manner as described in connection with Figures 1 to 3. The flange 50 carries a plurality of plates 20 riveted thereto for radial movement and which cooperate with the groove 7' and nuts 28 to lock the section 43 against removal whenever there is pressure in the tire 54. This locking arrangement, including the tang engagement of the tangs 25 under the inner edge of flange 50 is the same as described in connection with Figures 1 to 3.

Figure 5 illustrates a slight modification of the structure shown in Figure 4, in which the spring 60 is provided, fitting about the shank of the rivet 24 and having extending ends 62 apertured to fit about the shank 29 of the nuts 28. This spring 60 is arched inwardly at its center about the rivet shank to resiliently hold the plate 20 against the outer face of flange 50, and when the nuts 28 are tightened, the ends 62 of the spring are pressed inwardly to increase the spring pressure.

The spring 60, when nuts 28 are loosened, maintains the plate 20 in position with tangs 25 engaged under the flange edge, preventing accidental radial outward movement of the plate until such time as all pressure within the tire has been relieved, when the plate can then be moved outwardly to allow removal of rim section 43.

It will therefore be apparent that we have provided a novel type of wheel assembly especially adapted for travel in loose sand and gravel, and which is provided with adequate locking means for preventing any possibility of separation of the rim sections before the tire is completely deflated. This eliminates any danger to the operator and allows the use of the wheel in unskilled hands.

We are aware that certain changes may be made in details of the present invention without in any way departing from the underlying principles of the present invention, and we therefore do not intend to limit the invention except as defined by the scope and spirit of the appended claims.

We claim:

1. A wheel comprising a disc, a pair of complementary partial rim sections adapted to carry thereon a pneumatic tire, means permanently securing one of said rim sections to one face of the disc, means engageable with said last-named means for detachably securing the other rim section to the opposite face of the disc, and latching means carried by said other rim section engageable with said disc for limiting lateral displacement of said other rim section from said disc independently of said securing means when there is pressure in said tire.

2. A wheel comprising a disc-like body portion and a partial rim section rigid therewith, studs extending transversely through the disc adjacent its periphery, a complementary rim section, means engaging said studs for securing said second rim section in position to complete the rim, and radially shiftable latching means carried by said rim section engageable with said body portion for limiting lateral displacement of said rim section from said body portion under the influence of tire pressure when said securing means is loosened.

3. A wheel comprising a disc-like body portion having stud means, a detachable rim section, means engaging said stud means for securing said rim section in position, and interlocking means between said body portion and said rim section comprising a radially shiftable plate on said section and a channel on said body portion receiving the innermost radial edge of said plate when in locking position, said securing means holding said plate in locking position for preventing detachment of said section when there is any pressure tending to separate said section from said body portion.

4. A wheel comprising a disc-like body portion, a rim section adapted to be secured thereto to complete a tire carrying rim about the periphery thereof, a radially outwardly directed annular channel in said body portion, plate means secured to and radially movable on said rim section and engageable in innermost position in said channel to limit lateral displacement of said section from said body portion, and clamping nuts for securing said rim section to said body portion having portions holding said plate means in innermost position.

5. In combination, a wheel disc, complementary half-rim sections, studs permanently securing one section to one face of the disc and extending therethrough, nuts engageable with said studs for detachably securing the other rim section to the opposite face of the disc, and interlocking means between said disc and said other rim section held in locking position by said nuts for preventing detachment of said other rim section and movable radially into releasing position after said nuts have been loosened only in the absence of any axial pressure tending to separate said rim sections.

6. The combination, with a wheel disc having a fixed half rim section, a detachable complementary rim section and a tire adapted to exert axial pressure therebetween, of plate means carried by said detachable section, an annular radially outwardly opening channel on said disc over which said detachable section may be axially moved, means providing for radial inward movement of said plate means into said channel to lock said associated section against detachment, clamping means for securing said detachable section in position and adapted to hold said plate means in locking position, and means on said plate means engaging under the radial inner edge of said associated section preventing radial outward movement of said plate means upon release of said clamping means unless the axial pressure on said rim section is relieved.

7. In combination, a wheel disc, a pair of complementary half-rim sections, studs permanently securing one section to one face of said disc and projecting therethrough, nuts engageable with said studs for detachably securing the other section to the opposite face of the disc to complete the rim, a pneumatic tire carried thereby, and interlocking radially shiftable means on said second section engageable with said disc for locking said section against detachment under the influence of pressure in said tire upon release of said nuts.

8. The combination of claim 7 further characterized in that said shiftable means comprises a plate having wing portions positioned radially under said nuts when in locking position.

9. The combination of claim 7 further characterized in that said disc is provided with an axially offset radial lip against which said interlocking means abuts when said nuts are released with pressure in said tire tending to separate said rim sections.

10. The combination of claim 7 wherein said disc has an axially offset radially outwardly directed channel receiving said interlocking means and restraining said second rim section against detaching movement under influence of tire pressure upon release of said nuts.

FREDERICK W. BURGER.
WALTER E. SCHIRMER.